United States Patent Office 3,011,621
Patented Dec. 5, 1961

3,011,621
MEMORY TYPE ORDER FILLING CONVEYOR SYSTEMS
Richard J. Byrnes, West Allis, and James T. Pence and Barney O. Rae, Milwaukee, Wis., assignors to Cutler-Hammer, Inc., Milwaukee, Wis., a corporation of Delaware
Filed June 21, 1960, Ser. No. 37,762
33 Claims. (Cl. 198—78)

This invention relates to conveyor systems and more particularly to systems for automatically controlling conveyance of articles such as trays and the like from selected supply stations to selected delivery stations in accordance with orders placed at the delivery stations.

While not limited thereto, the invention is especially applicable to post office conveyor systems for controlling the conveyance of mail or letter trays from different supply stations to selected sorting stations.

An object of the invention is to provide improved conveyor systems.

Another object of the invention is to provide improved control systems for controlling the conveyance of selected numbers of articles or article trays from selected supply stations to selected delivery stations.

Another object of the invention is to incorporate in such control systems improved memory means for registering delivery information whereby, in the event the conveyor is stopped or power fails, the trays are delivered in accordance with the selection after the operation is resumed or after such power is reestablished.

Another object of the invention is to provide in such control systems improved means for controlling delivery of trays to delivery stations in sequential cycles, the order of delivery in each cycle to those delivery stations ordering trays being in accordance with the spacing of the delivery stations from the supply stations.

Another object of the invention is to provide in such control systems improved means for controlling release of another train of trays from a supply station as soon as the preceding train of trays has reached the main conveyor leading to the delivery stations and without waiting for delivery of the preceding train of trays.

Another object of the invention is to provide in such control systems improved means for detecting that the number of trays dispatched from a supply station is insufficient to fill an order and for canceling the remainder of such order and for conditioning the system for response to another order of trays.

Another object of the invention is to provide in such control systems improved means for detecting the absence of trays at a supply station when such trays are ordered, for storing such order information while other orders are delivered from the supply stations and for delivering such order on a subsequent cycle when trays become available at such supply station.

Another object of the invention is to provide in such control systems improved means for preventing a miscount of trays in the event of power failure, that is, for preventing any tray from causing a second count when the power is reestablished.

In accordance with the invention, there is provided a plurality of supply conveyors having access to a main conveyor and the latter having access to a plurality of side ledge delivery conveyors having sorting stations thereat. Each side ledge sorting station is provided with a control panel for selecting a supply station depending upon the type of mail desired, for selecting a desired number of trays and for starting the system whereby such trays are automatically delivered. Each such panel is also provided with a call indicator lamp, a filling indicator lamp, a cancel button, and indicating counters for indicating the total members of trays of different types of mail delivered to each sorting station. An automatic control system is provided having built-in memory devices whereby order and delivery information is stored so that, in the event of power failure or disconnection, the trays which have been dispatched will be correctly delivered when the power is reestablished. The system also incorporates circuitry for controlling cyclical delivery of orders of trays in accordance with the spacing of the sorting stations from the supply stations, for releasing a succeeding order of trays as soon as the preceding trays have entered the main conveyor, for delivering the available trays if less than the number ordered are available, for storing order information if no trays are available to be used on the next delivery cycle and for accurately counting and delivering the trays in the event of power failure when the power is reconnected.

The above mentioned and other objects and advantages of the invention and the manner of obtaining them will best be understood by reference to the following detailed description of an exemplary embodiment of a conveyor system taken in conjunction with the accompanying drawings, wherein:

Figure 1:
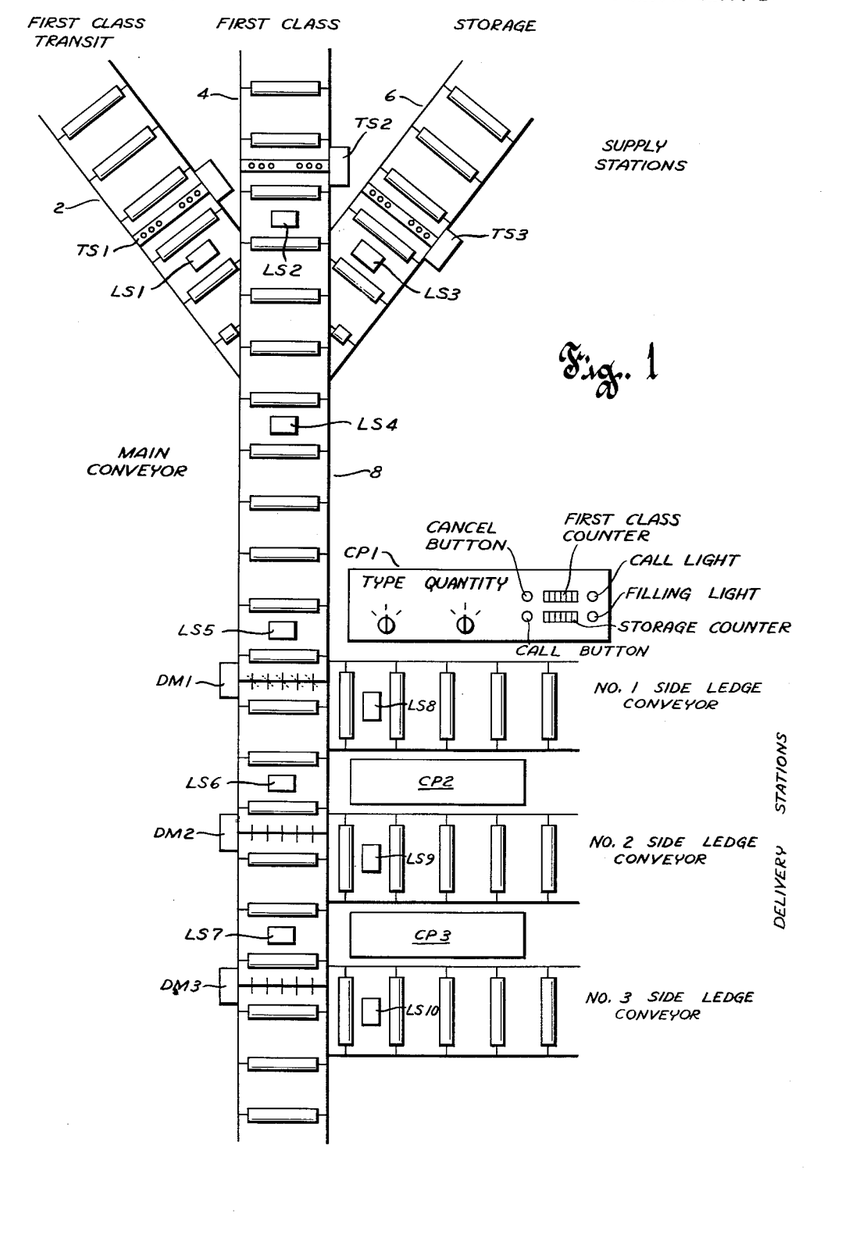
FIGURE 1 is a schematic illustration of a conveyor system layout showing supply stations, a main conveyor and delivery stations and control devices therefor.

Referring to FIG. 1, there is shown a conveyor system having a plurality of supply stations including a first class transit mail supply station, a first class mail supply station and a storage mail supply station. These supply stations are illustrated as being in the nature of converging conveyors 2, 4 and 6 having access to a main conveyor 8, the first class mail supply conveyor 4 being illustrated as being an extension of main conveyor 8. Supply conveyors 2, 4 and 6 are provided with controllable tray stops TS1, TS2 and TS3 and sensing devices such as tray counting limit switches LS1, LS2 and LS3, respectively. The tray stop on each such supply conveyor is positioned behind the associated limit switch so that as each tray is released by the stop it engages the associated limit switch to register a count. A feedback limit switch LS4 is mounted on the main conveyor beyond the junction of the supply conveyors therewith for the purpose of detecting and counting the entry of the trays unto the main conveyor.

A plurality of side ledge conveyors Nos. 1, 2 and 3 extend from the right-hand side of the main conveyor at a right angle to the latter and are spaced from one another. A plurality of diverter mechanisms DM1, DM2 and DM3, one for each side ledge conveyor, are mounted transversely on the main conveyor. Each such diverter mechanism is positioned across the main conveyor adjacent the entry side of its associated side ledge conveyor for diverting trays from the main conveyor onto the side ledge conveyor. A plurality of side ledge conveyor control limit switches LS5, LS6 and LS7 are spaced along the main conveyor there being one such limit switch for each side ledge conveyor. Each such limit switch LS5, LS6 and LS7 is positioned directly ahead of its associated diverter mechanism DM1, DM2 and DM3 for engagement by the leading tray of a group thereof to start the side ledge conveyor operating.

Side ledge conveyors Nos. 1, 2 and 3 are provided with limit switches LS8, LS9 and LS10, respectively, each such limit switch being positioned adjacent the entry end of the associated side ledge conveyor for detecting and counting the trays and for controlling termination of the call and restoration of the associated diverter mechanism when the last tray has been diverted onto the side ledge conveyor. Side ledge conveyors Nos. 1, 2 and 3 have sorting stations thereat, not shown, for sorting the mail delivered in trays thereto.

Side ledge conveyors Nos. 1, 2 and 3 are provided at their sorting stations with control panels CP1, CP2 and CP3, respectively, for controlling the conveyor system. Control panel CP1 is provided with a first manually operable plural position selector switch for selecting the type of mail to be delivered thereto, that is, for selecting one of the supply conveyors stations 2, 4 or 6. A second manually operable plural position selector switch is provided for selecting a quantity of trays to be delivered thereto. A manually operable call button switch is provided for starting the conveyor system after the aforementioned selections have been made. A cancel button is provided for canceling the order after it has been placed but before filling thereof has been initiated. A call light is provided for indicating that an order has been placed and a filling light is provided for indicating that operation of the system has been initiated in response to a call. Control panel CP1 is also provided with a pair of visual counters for indicating the total number of first class transit and first class mail trays that have been delivered to side ledge conveyor No. 1 and for indicating the total number of storage mail trays that have been delivered to side ledge conveyor No. 1. Control panels CP2 and CP3 are similar to control panel CP1 and the details thereof have not been shown in FIG. 1 to avoid complicating the drawings.

Supply conveyors 2, 4 and 6, main conveyor 8 and side ledge conveyors Nos. 1, 2 and 3 are of the well-known belt driven roller type and are adapted for conveying mail trays therealong. Each conveyor is provided with a pair of support or frame members between which a plurality of conveyor rollers are rotatably supported. The conveyor rollers are adapted to be frictionally driven by endless motor driven belts, not shown, which belts travel beneath the rollers so that the rollers support and convey the trays thereover. While only three supply conveyors and only three side ledge delivery conveyors have been shown for ease of illustration, it will become apparent as the description proceeds that any desired number of supply conveyors and delivery conveyors could be connected in the system and the control elements therefor connected to the circuit multiples shown in FIGS. 2a and 2b.

Figure 2A:
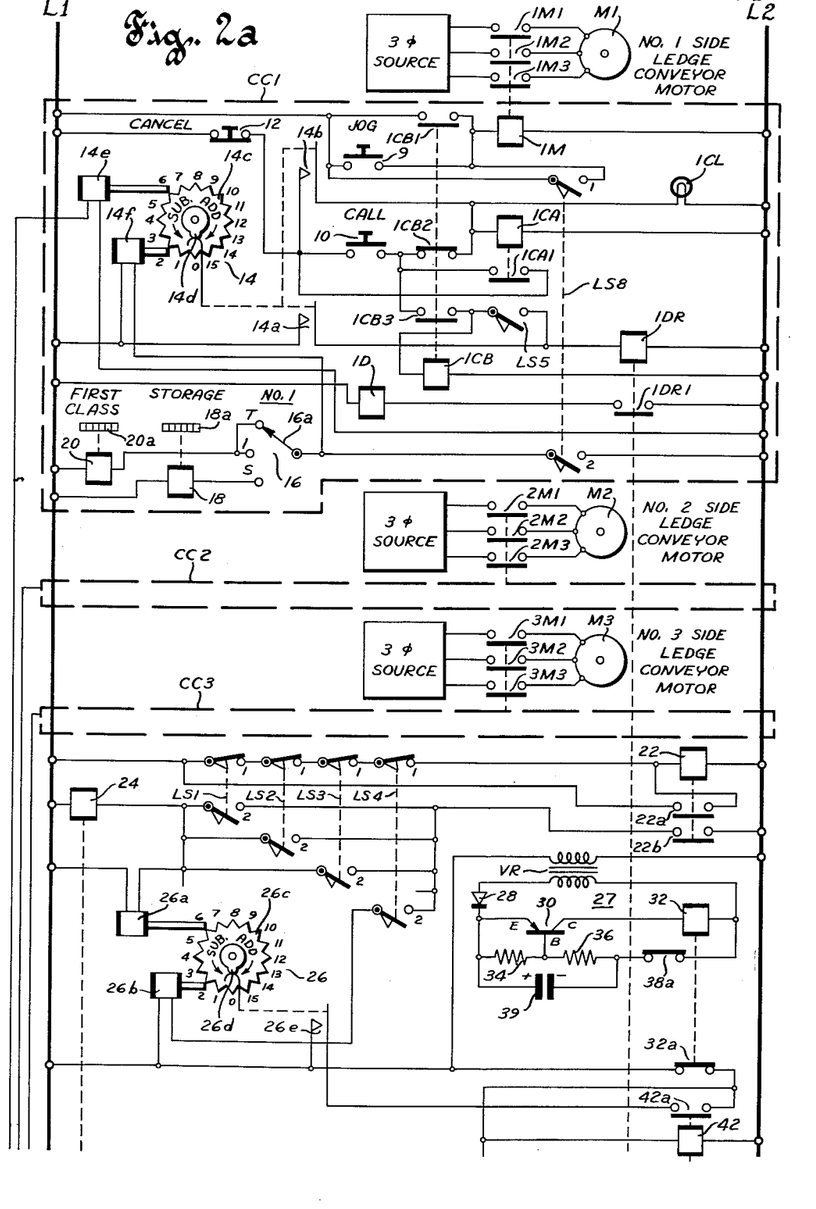
FIGS. 2a and 2b when connected to one another diagrammatically show a control circuit for the conveyor system of FIG. 1.
Figure 2B:
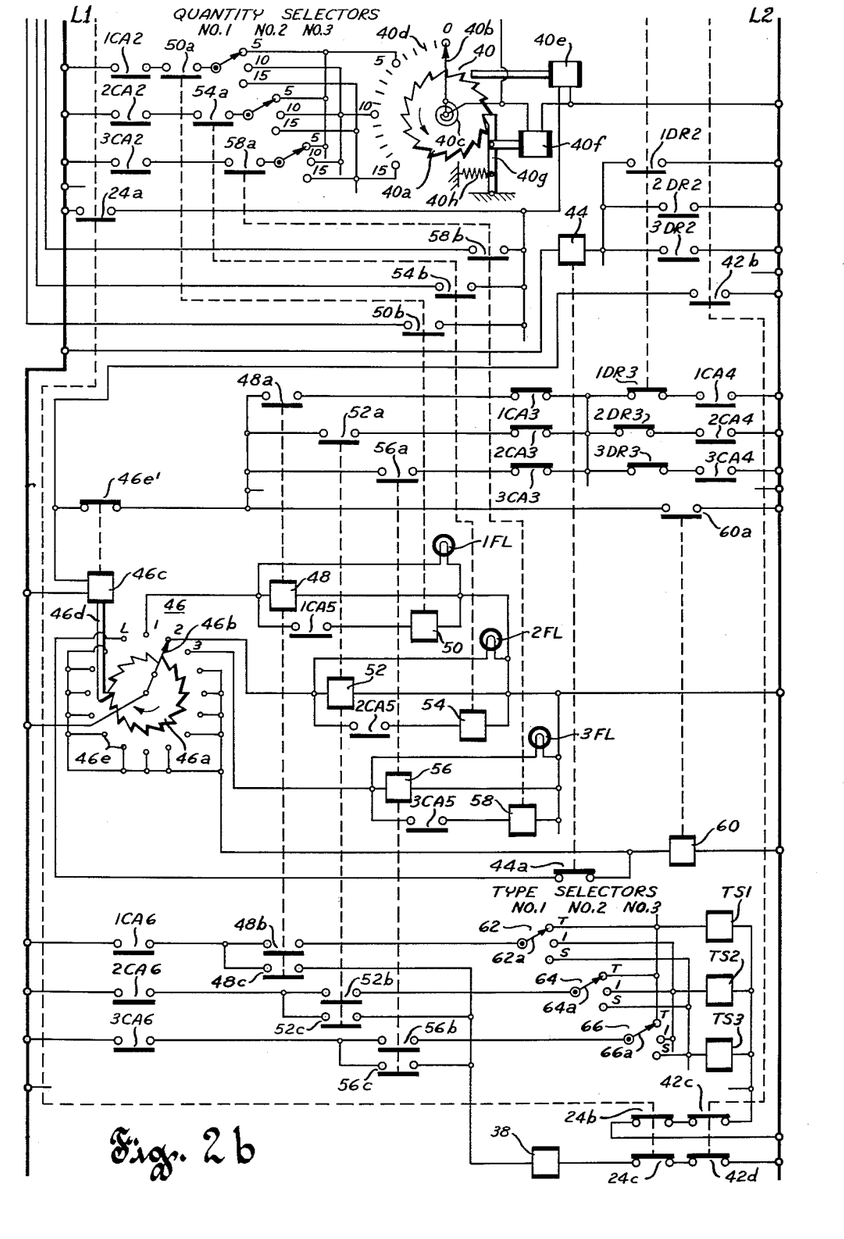

Referring to FIGS. 2a and 2b, there is shown a plurality of motors M1, M2 and M3, one for each side ledge conveyor, for operating side ledge conveyors Nos. 1, 2 and 3, respectively. These motors are of the plural phase alternating current type or the like and are energized from a three-phase alternating current power supply source, three separate supply sources for the respective motors being shown in FIG. 2a for ease of illustration. Control circuits CC1, CC2 and CC3, one for each side ledge sorting station, are connected in parallel across power supply lines L1 and L2, the latter being connectable to a suitable single phase alternating current power supply source such as one phase of the aforementioned three-phase source.

Control circuit CC1 is provided with a main contactor 1M having normally open contacts 1M1, 1M2 and 1M3 for connecting motor M1 to the three-phase source. A Jog switch 9 is provided for manually controlling main contactor 1M to run motor M1. A Call pushbutton switch 10 is provided for initiating an order of trays to side ledge conveyor No. 1 and a Cancel pushbutton switch 12 is provided for canceling such order, these pushbutton switches also being shown schematically in FIG. 1. Control circuit CC1 is also provided with a first control relay 1CA under the control of Call switch 10 for initiating operation of the system and a second control relay 1CB for initiating operation of the associated side ledge conveyor motor M1 under the control of limit switch LS5. There is also provided a diverter control relay 1DR for operating a diverter magnet coil ID. An add-subtract switching counter 14 of the stepping type or the like is provided for counting and registering a number of trays leaving a supply station and for recountnig these trays as they enter side ledge conveyor No. 1. Counter 14 is provided with a first normally open switch 14a for controlling diverter control relay 1DR and a second normally open switch 14b in the maintaining circuit of relay 1CA for controlling termination of the call. Counter 14 is also provided with a ratchet wheel 14c having an extending cam 14d thereon for operating switches 14a and 14b. Counter 14 is stepped in the forward or clockwise direction by an adding magnet coil 14e and is stepped in the reverse or counterclockwise direction by a subtracting magnet coil 14f. A call lamp 1CL is provided for indicating when lit that a call for trays has been placed. Limit switch LS5, also shown in FIG. 1, is provided for controlling operation of motor M1 and a limit switch LS8, also shown in FIG. 1, is provided for controlling energization of subtracting magnet coil 14f. Control circuit CC1 is further provided with a first level 16 of a Type selector switch No. 1 also shown on control panel CP1 in FIG. 1. Switch level 16 is provided with a movable contact brush 16a for selectively engaging one of three stationary contacts marked T, 1 and S when first class transit mail or first call mail or storage mail as desired is selected. Contact S is connected through the operating element such as a magnet coil 18 or the like of a storage mail tray counter 18a to power supply line L1. Contact 1 is connected through the operating element such as a magnet coil 20 or the like of a first class transit and first class mail tray counter 20a to power supply line L1. Contacts T and 1 are connected to one another to register the total amount of these types of mail on counter 20a.

Control circuits CC2 and CC3 are similar to control circuit CC1 and the details thereof have not been shown to avoid complicating the drawings. However, as will become apparent as the description proceeds, certain elements such as relay contacts 1CA2, 2CA2, 3CA2, for example, are provided with prefix numbers 1, 2 and 3, respectively, to indicate that they are operated by relay 1CA in control circuit CC1 and similar relays in control circuit CC2 and CC3, respectively. Also, contacts 1CA1, 1CA2, 1CA3, etc. of each relay such as relay 1CA, for example, are given reference letters corresponding to the relay reference letters and additionally are provided with suffix numbers 1, 2, 3, etc. to distinguish the same and to indicate the total number of contacts on the relay.

The aforementioned limit switches LS1, LS2, LS3 and LS4 are each provided with a pair of contacts 1 and 2. Normally closed contacts 1 of these limit switches are connected in series with the operating coil of a control relay 22 across supply lines L1 and L2. Normally open contacts 2 of limit switches LS1, LS2 and LS3 are connected in parallel for controlling relay 24 and the adding or clockwise stepping coil 26a of a switching counter 26. Normally open contact 2 of limit switch LS4 is connected for controlling the subtracting or counterclockwise stepping coil 26b of counter 26. Counter 26 is similar to counter 14 hereinbefore described and is provided with a ratchet wheel 26c having a projecting cam 26d thereon for operating a normally open switch 26e.

The primary winding of a voltage reducing transformer VR is connected across supply lines L1 and L2 to supply a timing circuit 27 hereinafter described. The left-hand end of the secondary winding of transformer VR is connected through an unidirectional conducting device such as a diode 28 and emitter electrode E and collector electrode C of a transistor 30 and the operating coil of a relay 32 to the right-hand side of such secondary winding. The left-hand end of the secondary winding is also connected through diode 28 and voltage divider resistors 34 and 36 and a normally closed contact 38a of a relay 38 hereinafter described to the right-hand end of the secondary winding. The junction of resistors 34 and 36 is connected to base electrode B of transistor 30. Transistor 30 is a controllable solid element semi-conductor device of the PNP conductivity type or the like. A timing capacitor 39 is connected across resistors 34 and 36.

A plurality of quantity selectors No. 1, No. 2 and No. 3 are provided for selecting a desired number of trays, selector No. 1 being also shown on control panel CP1 in FIG. 1, there being one such quantity selector for each side ledge conveyor sorting station. Each quantity selector is provided with a manually settable contact brush and three stationary contacts for selecting 5, 10 or 15 trays, these stationary contacts being marked 5, 10 and 15, respectively, on each quantity selector switch. An electrically resettable counter 40 of the selector switch type is provided for detecting the release of the selected number of trays and for operating a relay 42. Counter 40 is provided with a ratchet wheel 40a rotatably supported on a fixed shaft and a contact brush 40b fixed to the ratchet wheel and connected through a spiral return spring 40c to the fixed shaft. A contact bank 40d is provided for engagement by contact brush 40b. A stepping magnet coil 40e controls stepping of switch 40 in the counterclockwise direction and a release magnet coil 40f controls resetting of the switch to its normal zero position. A holding pawl 40g is supported at its lower end on a fixed pivot and engages at its upper end ratchet wheel 40a to hold the latter after each counterclockwise step. A suitable spring 40h or the like biases pawl 40g into engagement with the ratchet wheel. Pawl 40g is connected intermediate the ends thereof to the operating member of resetting magnet coil 40f whereby the latter controls withdrawal of the upper end of the pawl from the ratchet wheel to release the same for return to its normal zero position under the force of return spring 40c. For illustrative purposes, selector switch 40 is shown as being provided with contacts at operating positions 5, 10 and 15. The three contacts marked 5 of quantity selector switches Nos. 1, 2 and 3 are connected to one another and to contact 5 of selector switch 40, the three contacts marked 10 of the quantity selector switches are connected to one another and to contact 10 of selector switch 40 and the three contacts marked 15 of the quantity selector switches are connected to one another and to contact 15 of selector switch 40.

The operating coil of a lockout relay 44 is connectable across supply lines L1 and L2 under the control of diverter control relay 1DR in side ledge No. 1 control circuit CC1 or similar diverter control relays in control circuits CC2 and CC3. There is also provided a stepping switch 46 for finding the side ledge sorting station for which an order has been placed. Switch 46 is provided with a ratchet wheel 46a having a contact brush 46b secured thereto and a stepping magnet coil 46c having an operating pawl 46d for stepping ratchet wheel 46a in the clockwise direction. A contact bank 46e is provided having a series of contacts 1, 2, 3 etc., for successive engagement by contact brush 46b. Contact 1 is connected for energizing the operating coils of relays 48 and 50 and filling indicator lamp 1FL for delivery station No. 1, such filling indicator lamp being also shown on control panel CP1 in FIG. 1. Contact 2 is connected for energizing the operating coils of relays 52 and 54 and filling indicator lamp 2FL for delivery station No. 2. Contact 3 is connected for energizing the operating coils of relays 56 and 58 and filling indicator lamp 3FL for delivery station No. 3. The remaining contacts of stepping switch 46 with the exception of the last contact L are connected to one another and through the operating coil of a relay 60 to supply line L2, relay 60 being provided for the purpose of stepping the switch through the unused contacts thereof. The last contact L of switch 46 is connected through a normally closed contact 44a of relay 44 and the operating coil of relay 60 to supply line L2. The Type selector switch, the first level 16 of which is shown within side ledge No. 1 control circuit CC1, is provided with a second level 62 shown at the lower portion of FIG. 2b. Similarly, the Type selector switch of side ledge No. 2 is provided with a second level 64 and the Type selector switch of side ledge No. 3 is provided with a second level 66. Each such second level is provided with a manually movable contact brush 62a, 64a and 66a mechanically connected for movement with the brush of the respective first level and three stationary contacts marked T, 1 and S for first class transit mail, first class mail and storage mail, respectively. Contacts T of the three second levels of the Type selector switches are connected to one another and to the operating coil of tray stop TS1. Contacts 1 of the three second levels of these switches are connected to one another and to the operating coil of tray stop TS2. Contacts S of the three second levels of these switches are connected to one another and to the operating coil of tray stop TS3.

*Operation*

Let it be assumed that a suitable power supply source is connected to lines L1 and L2. Let it also be assumed that such connection of power energizes the supply conveyor motors and the main conveyor motor, not shown, to start supply conveyors 2, 4 and 6 and main conveyor 8 in a suitable manner. Connection of power to lines L1 and L2 causes energization of the operating coil of relay 22 through contacts 1 of limit switches LS1, LS2, LS3 and LS4. Normally open contact 22a closes to complete a self-maintaining circuit in shunt of the aforementioned contacts 1 of the limit switches. Normally open contact 22b closes to complete a point in the energizing circuit of the operating coil of relay 24 and forward stepping magnet coil 26a. The primary winding of transformer VR energizes across lines L1 and L2. As a result, a rectified voltage is applied from the secondary winding of transformer VR across the emitter and collector electrodes of transistor 30 and the operating coil of relay 32 in series. Unidirectional current flows from the left-hand end of the secondary winding of transformer VR through rectifier 28, capacitor 39 and normally closed contact 38a to the right-hand end of the secondary winding to charge capacitor 39 in the direction shown by the positive and negative symbols. When capacitor 39 is charged, the current flow is diverted through resistors 34 and 36 and normally closed contact 38a. A voltage proportional to the voltage drop across resistor 34 is applied across emitter electrode E and base electrode B to bring the base electrode negative relative to the emitter electrode thereby to render transistor 30 conducting. As a result, current flows through emitter E and collector C and the operating coil of relay 32 to energize the latter and to open normally closed contact 32a of relay 32.

Let it be assumed that five trays of first class transit mail are desired to be delivered to side ledge conveyor sorting station No. 1. To place this order, the Type selector switch at control panel CP1 is set in its operating position T as shown. As a result, contact brush 16a of the first level 16 of this switch engages contact T as shown in FIG. 2a and contact brush 62a of the second level of this switch engages contact T as shown in the lower portion of FIG. 2b. Quantity selector switch No. 1 is set in its first operating position wherein the contact brush thereof is in engagement with stationary contact 5. For purposes of description, let it be assumed that contact brush 46b of stepping switch 46 in FIG. 2b is resting on contact 2 as shown in FIG. 2b. Stepping switch 46 normally assumes this position following delivery of trays to delivery station No. 1 as will become apparent when the description proceeds. Stepping switch 46 being in position 2, application of power to lines L1 and L2 causes lamp 2FL to light in a circuit extending through brush 46b and contact 2 of switch 46. The operating coil of relay 52 energizes in parallel with lamp 2FL and closes normally open contacts 52a, 52b and 52c thereof.

To initiate operation of the system, Call switch 10 on control panel CP1 is momentarily pressed to close its contacts. As a result, call lamp 1CL energizes and lights in a circuit extending through Cancel switch 12, Call switch 10 and normally closed contact 1CB2 of relay 1CB to indicate that a call has been placed. The operating coil of control relay 1CA energizes in parallel with call lamp 1CL to cause stepping switch 46 to find the calling station. Normally open contact 1CA1 closes to complete a self-maintaining circuit in shunt of Call switch 10 thereby to maintain relay 1CA and lamp 1CL energized when the call switch is released. Normally open contact 1CA2 in the upper left-hand portion of FIG. 2b closes to complete a point in the energizing circuit of the operating coil of relay 42. Normally closed contact 1CA3 in the right-hand portion of FIG. 2b opens to interrupt a point in one of the parallel energizing circuits of stepping magnet coil 46c. Normally open contact 1CA4 in the right-hand portion of FIG. 2b closes to complete another one of the energizing circuits of stepping magnet coil 46c to cause stepping switch 46 to hunt for and find the calling station. Normally open contact 1CA5 in FIG. 2b closes to complete a point in the energizing circuit of the operating coil of relay 50 and normally open contact 1CA6 in FIG. 2b closes to complete a point in the energizing circuits of the operating coils of tray stop TS1 and relay 38. Closure of contact 1CA4 causes energization of coil 46c in a circuit extending through normally closed contacts 1DR3 and 2CA3 and the then-closed contact 52a and normally closed self-interrupting contact 46e'.

As shown in FIG. 2b, stepping switch 46 is of the type which is stepped in response to deenergization of its operating magnet coil 46c. When operating magnet coil 46c is energized as aforedescribed, pawl 46d is extended to engage the next tooth on ratchet wheel 46a and, when the operating magnet coil is deenergized, the pawl is spring returned to its normal position to rotate the ratchet wheel and contact brush one step in the direction of the arrow. Energization of coil 46c causes opening of contact 46e' to deenergize the same. As a result, switch 46 is stepped to the next operating position wherein brush 46b engages contact 3. The operating coil of relay 52 is deenergized to open contact 52a thereby to interrupt further the aforementioned energizing circuit of coil 46c and to open contacts 52b and 52c. Also, contact 46e' recloses upon deenergization of coil 46c. In operating position 3, stepping switch 46 causes energization of the operating coil of relay 56. As a result, contact 56a closes to complete another energizing circuit for coil 46c through contacts 1CA4, 1DR3, 3CA3 and 46e. Contacts 56b and 56c also close without effect at this time. Contact 46e' opens to deenergize coil 46c and to step switch 46 to the next position whereupon relay 56 deenergizes to open contacts 56a, 56b and 56c and contact 46e' recloses.

The remaining vacant contacts of stepping switch 46 with the exception of the last contact L are connected to one another and through the operating coil of relay 60 to supply line L2. Contact brush 46b of the stepping switch being connected to line L1, in each successive operating position the operating coil of relay 60 is energized through contact brush 46b and each successive contact of switch 46 to close contact 60a. As a result, contact 60a energizes coil 46c in each successive operating position of the switch whereafter contact 46e' deenergizes coil 46c to step the switch to the next operating position. When contact brush 46b engages the last contact L, the operating coil of relay 60 is energized therethrough and through normally closed contact 44a of relay 44. As a result, switch 46 is stepped to its operating position wherein brush 46b engages contact 1.

Engagement of contact 1 by brush 46b of switch 46 causes energization of the operating coils of relays 48 and 50 and lamp 1FL in parallel, the energizing circuit of the operating coil of relay 50 extending through the then-closed contact 1CA5 of relay 1CA. Lamp 1FL lights to indicate that an order for trays to the side ledge conveyor No. 1 delivery station has been initiated. Contact 50a closes to mark a contact of counter 40 with a voltage, such contact marking being indicative of the number of trays ordered by the aforementioned setting of Quantity selector switch No. 1. This marking is accomplished by application of a voltage from line L1 through contacts 1CA2 and 50a and the contact brush and stationary contact 5 of Quantity selector switch No. 1 to contact 5 of counter 40. Contact 50b closes a point in the energizing circuit of adding coil 14e of counter 14 to prepare the latter for counting the trays as they are released from the selected supply station.

Contact 48a of relay 48 closes. However, coil 46c remains deenergized as contact 1CA3 is open to stop switch 46 on contact 1. Contacts 48b and 48c close to complete energizing circuits for the operating coils of relay 38 and tray stop TS1. These circuits extend from line L1 through contact 1CA6 and then in one branch through contact 48c, the operating coil of relay 38 and normally closed contacts 24c and 42d to line L2 and in another branch through contact 48b, brush 62a and contact T of switch level 62, the operating coil of tray stop TS1 and normally closed contacts 42c and 24b to line L2. Relay 38 opens its normally closed contact 38a in the lower portion of FIG. 2a to initiate operation of the RC timing circuit comprising resistors 34 and 36 and capacitor 39. Such opening of contact 38a removes the rectified voltage from capacitor 39 to permit the latter to start discharging through resistors 34 and 36 in series. These resistors limit such discharge current to determine the time constant of the RC circuit. Also, the resistance of resistor 34 is selected so as to maintain normally, when contact 38a is closed, the proper positive emitter to base voltage on transistor 30 to maintain the latter conducting and also to maintain such voltage in response to the capacitor discharge current following opening of contact 38a to maintain transistor 30 conducting for a predetermined time interval. Thus, the operating coil of relay 32 will be maintained energized and contact 32a thereof will be maintained open for such time interval and contact 32a will close at the end of such time interval provided contact 38a has not reclosed. As the description proceeds it will become apparent that this feature is provided to cause switch 46 to step to control the system to fill the next order after such time interval in the event there are no trays or insufficient trays to fill the present order. In the event there are insufficient trays, the trays that are available will be delivered and the remainder of the order will be canceled. In the event there are no trays to fill an order, such order will be stored and automatically filled in the next delivery cycle provided trays are then available at the supply station.

*Counting released trays*

As a result of the aforementioned energization of the operating coil of tray stop TS1, a tray is released from first class transit conveyor 2 and such tray engages limit switch LS1 to open contact 1 and to close contact 2 thereof. Contact 2 of limit switch LS1 completes an energizing circuit for adding magnet coil 26a of counter 26 through contact 22b. Counter 26 is stepped one step from its normal zero position whereby cam 26d disengages switch 26e to permit the latter to close a point in a maintaining circuit for relay 42 and coil 40f. The operating coil of relay 24 also energizes in parallel with coil 26a and closes normally open contact 24a and opens normally closed contacts 24b and 24c. Closure of contact 24a completes an energizing circuit through contact 50b to energize adding coil 14e of counter 14. Contact 24b interrupts the energizing circuit of the operating coil of tray stop TS1 whereby the tray stop engages the second tray to stop the same for the purpose of spacing the trays from one another. Contact 24c interrupts the energizing circuit of relay 38. As a result, contact 38a recloses to cause recharging of capacitor 40 before the latter has completely discharged and to maintain energization of the operating coil of timing relay 32 during the time interval between the finding of the calling station by switch 46 and the engagement of limit switch LS1 by the first tray.

Energization of adding coil 14e of switch 14 causes stepping of the latter one step from its normal zero position. As a result, cam 14b disengages switches 14a and 14b to permit the latter to close. Switch 14a completes an energizing circuit for the operating coil of diverter control relay 1DR. Normally open contact 1DR1 closes to complete an energizing circuit for operating magnet coil 1D of diverter mechanism DM1 in FIG. 1 thereby to actuate such diverter mechanism into its diverting position whereby it will turn and divert trays onto side ledge conveyor No. 1. Switch 14b of counter 14 completes a maintaining circuit for call lamp 1CL and the operating coil of relay 1CA in shunt of call switch 10 and normally closed contact 1CB2 to maintain energization of lamp 1CL and relay 1CA following energization of control relay 1CB as hereinafter described. Normally open contact 1DR2 closes to complete an energizing circuit for the operating coil of lockout relay 44 to open normally closed contact 44a of the latter. It will be apparent that contact 44a prevents recycling of switch 46, that is, prevents stepping of switch 46 from contact L to contact 1 and thus prevents initiation of another delivery to a given side ledge conveyor until all succeeding orders in each cycle have been filled. Normally closed contact 1DR3 opens to prevent continuous stepping of switch 46 following stepping thereof to contact 2 as hereinafter described. Closure of contact 24a of relay 24 also causes energization of stepping magnet coil 40e of counter 40 thereby to step the latter to its first operating position.

When the first tray disengages limit switch LS1 contact 1 thereof recloses and contact 2 thereof reopens. As a result, coil 26a of switch 26 is deenergized whereupon the operating member thereof is withdrawn by a suitable spring or the like. The operating coil of relay 24 is also deenergized to open contact 24a thereby to deenergize coils 14e and 40e of counters 14 and 40, respectively. In a similar manner the operationg members of coils 14e and 40e are withdrawn by a suitable spring or the like to reset the same for a second stepping action. Contact 24b recloses to cause reenergization of the operating coil of tray stop TS1 thereby to cause release of the second tray. It will be apparent that the aforementioned deenergization of the operating coil of tray stop TS1 causes spacing of the second tray from the first tray, this spacing being determined by the distance between tray stop TS1 and limit switch LS1 and being of the order of six inches or the like. Contact 24c recloses to cause reenergization of the operating coil of relay 38 thereby to reopen contact 38a. Reopening of contact 38a causes initiation of discharge of capacitor 39 through resistors 34 and 36. This discharge current flowing through resistor 34 maintains base electrode B negative relative to emitter electrode E of transistor 30 to maintain the latter conducting and to maintain relay 32 energized for a predetermined period of time, this period of time being longer than the interval between moving trays. The second tray engages limit switch LS1 to operate the system in a similar manner thereby to step counters 14 and 26 to operating position 2 and to step switch 40 to its second operating position and tray stop TS1 causes release of each succeeding tray upon disengagement of limit switch LS1 by the immediate leading tray.

When the fifth tray engages limit switch LS1, contact 1 thereof opens and contact 2 thereof closes. Coil 26a is energized to step counter 26 to operating position 5. The operating coil of relay 24 is energized to close contact 24a thereby to energize coil 14e of counter 14 to step the latter to operating position 5. It will be apparent that contact 26e of counter 26 is open in the normal zero position of the counter and remains closed in all other operating positions thereof. Similarly, contacts 14a and 14b of counter 14 are open in the normal zero position of the counter and remain closed in all other operating positions thereof. Contact 24a of relay 24 also causes energization of coil 40e to step switch 40 into its fifth operating position. Contact 24b opens to interrupt energization of the operating coil of tray stop TS1 to lock the latter in its stopping condition. Contact 24c opens to interrupt energization of the operating coil of relay 38 to reclose contact 38a.

Contact brush 40b in the fifth operating position of switch 40 detects the aforementioned marking that five trays have been ordered and completes and energizing circuit for the operating coil of relay 42 in a circuit extending from line L1 through contacts 1CA2 and 50a, the contact brush and contact 5, of Quantity selector switch No. 1, contact 5 and brush 40b of switch 40 and the operating coil of relay 42 of line L2. Normally open contact 42a closes to complete a maintaining circuit for the operating coil of relay 42 through the then-closed switch 26e of counter 26. Switch 40 also completes an energizing circuit for resetting coil 40f in parallel with the operating coil of relay 42. As a result, resetting coil 40f withdraws holding pawl 40g from ratchet wheel 40a whereupon spiral spring 40c returns switch 40 to its normal zero position. However, relay 42 and resetting coil 40f remain energized through the maintaining circuit. Normally open contact 42b closes to complete an energizing circuit for coil 46c of switch 46 across lines L1 and L2. Contact 42c in the lower right-hand portion of FIGURE 2b opens another point in the circuit of the operating coil of tray stop TS1 thereby to maintain deenergization of such operating coil when contact 24b recloses whereby the tray stop stops all further trays. Contact 42d opens another point in the circuit of the operating coil of relay 38 to prevent operation of the timing circuit because all the trays ordered have been released. The aforementioned energization of coil 46c of switch 46 causes pawl 46d to be extended to engage the next tooth on ratchet wheel 46a and causes contact 46e' to open without effect at this time as contact 60a in series therewith is open.

When the fifth tray disengages limit switch LS1, contact 2 of the latter reopens to deenergize coil 26a and the operating coil of relay 24. Contact 24a opens to deenergize coils 14e and 40e to withdraw their operating members. Contacts 24b and 24c close without effect as contacts 42c and 42d in series therewith, respectively, are open.

*Feedback count*

It will now be described how the feedback circuits operate to count the trays as they reach main conveyor 8 and condition the system for response to another call signal to deliver another order as soon as the trays of the order being filled have entered upon the main conveyor and have passed limit switch LS4.

When the first tray engages feedback limit switch LS4, contact 1 thereof opens and contact 2 thereof closes to energize subtracting coil 26b of counter 26. As a result, counter 26 is stepped back one step in the counterclockwise direction to its operating position 4. When such first tray disengages limit switch LS4, contact 2 thereof reopens to deenergize coil 26b and to allow the aforementioned spring to retract its operating member. In a similar manner, each tray passing over limit switch LS4 causes counter 26 to step back one step. When the fifth and last tray of the order of trays successively engages and disengages limit switch LS4, counter 26 is stepped to its normal zero position. In this position, cam 26d opens switch 26e to interrupt energization of coil 40f and the operating coil of relay 42 by opening their maintaining circuit. As a result, spring 40h pulls pawl 40g into engagement with ratchet wheel 40a. Contact 42a opens another point in such maintaining circuit. Contact 42b opens to deenergize coil 46c to cause pawl 46d to be withdrawn thereby to step switch 46 to its second operating position wherein brush 46b engages contact 2. Contact 42c closes a point in the energizing circuits of the operating coils of tray stops TS1, TS2 and TS3 to prepare the latter for delivery of the next order of trays. Contact 42d closes a point in the energizing circuit of the operating coil of relay 38.

Stepping of switch 46 from contact 1 to contact 2 causes deenergization of lamp 1FL and the operating coils of relays 48 and 50 and causes energization of lamp 2FL and the operating coil of relay 52. As a result, contacts 48a, 48b, 48c, 50a and 50b open and contacts 52a, 52b and 52c close.

In this condition, the system is ready to initiate the delivery of another order of trays in response to a call signal from a succeeding side ledge conveyor station in the same cycle of rotation of switch 46. In other words, any side ledge conveyor station which is spaced farther from the supply stations than the side ledge conveyor being filled can initiate an order of trays as soon as the trays for the immediately preceding side ledge conveyor have passed limit switch LS4. But none of the side ledge conveyor stations which are nearer the supply stations than the side ledge conveyor being filled can initiate an order of trays until all of the side ledge conveyors spaced farther from the side ledge conveyor being filled and which have placed orders have received deliveries. This is accomplished by relay 44 maintaining contact 44a open as long as a diverter control relay such as relay 1DR of one of the delivery stations is energized whereby one of the contacts 1DR2, 2DR2 or 3DR2 is closed, contacts 2DR2 and 3DR2 being contacts of relays in station control circuits CC2 and CC3, respectively, corresponding to relay 1DR of circuit CC1 of station No. 1. Stepping switch 46 remains in its second operating portion until another order is placed and coil 46c thereof remains deenergized although contacts 46e', 52a, 2CA3 and 1CA4 are closed because contact 1DR3 remains open until all the trays for side ledge conveyor No. 1 have been delivered.

To facilitate understanding of the operation of the system, in the above description the operation was described in steps of (1) counting the released trays and (2) feedback count, wherein it was assumed that all of the trays of the train of five trays passed limit switch LS1 before the leading tray thereof engaged limit switch LS4. Actually, the system operates equally well when the leading tray engages limit switch LS4 before the trailing tray or trays have passed limit switch LS1. To accomplish this, counter 26 is constructed so that it continuously maintains a registration of the number of trays that are in transit between limit switches LS1 and LS4. Thus, in the event four trays have passed limit switch LS1 and the leading tray thereof has also passed limit switch LS4, counter 26 will have been stepped four steps forward and one step back to operating position 3 thereby to register the three trays in transit between the limit switches. Also, it will be apparent that limit switches LS2 and LS3 operate counter 26 in the same manner as limit switch LS1 when trays are ordered from supply conveyors 4 and 6, respectively.

Moreover, counter 26 is constructed so that ratchet wheel 26c is immobilized when coils 26a and 26b are energized simultaneously in the event limit switches LS1 and LS4 are engaged by trays at the same time. Also, in the event the energizations of coils 26a and 26b overlap or if one coil is energized for a longer period than the other coil, counter 26 will maintain a correct count. In this connection, it will be apparent that while counter 26 has been shown schematically for ease of illustration and the operation thereof has been described in a simplified exemplary manner wherein the actuating members of coils 26a and 26b step ratchet wheel 26c in response to energization of each associated coil, a ratchet wheel and actuating members similar to ratchet wheel 46a and actuating pawl 46d of switch 46 could as well be employed in counter 26 to step the latter in response to deenergization of each associated stepping coil. Counter 26 is of a well known type such as, for example, the "Eagle" HZ200 Series Add-Subtract Counter and the details thereof have not been shown to avoid complicating the drawings.

*Delivery count*

The five trays which were ordered by side ledge conveyor station No. 1 have now passed limit switch LS4 and are traveling along main conveyor 8 toward the delivery stations. When the leading tray engages limit switch LS5, the latter closes its contact to energize the operating coil of relay 1CB in the upper portion of FIG. 2a through switch 14a. Normally open contacts 1CB1 and 1CB3 close and normally closed contact 1CB2 opens. Contact 1CB1 completes an energizing circuit for the operating coil of contactor 1M across supply lines L1 and L2. As a result, normally open contacts 1M1, 1M2 and 1M3 close to connect the three-phase source to the stator of motor M1 to energize the motor and to start side ledge conveyor No. 1 running. Contact 1CB2 interrupts the original mantaining circuit of the operating coil of relay 1CA and lamp 1CL, the latter, however, being maintained energized through switch 14b at this time. As will become apparent as the description proceeds, interruption of this original maintaining circuit which extends also through contact 1CA1 and switch 12 prepares control circuit CC1 for restoration when the trays have been delivered. Contact 1CB3 completes a self-maintaining circuit extending through contact 1CA1 and switch 12 to maintain the operating coil of relay 1CB energized as limit switch LS5 opens in the space between the trays. As will be apparent from the foregoing description, the function of limit switch LS5 is to start side ledge conveyor No. 1 running when the leading tray approaches diverter mechanism DM1. Side ledge conveyors Nos. 2 and 3, etc., are similarly started under the control of limit switches LS6 and LS7, respectively, shown in FIG. 1 when calls that have been placed at stations thereat are being filled.

Diverter mechanism DM1 being in its diverting position shown in dotted lines in FIG. 1, the leading tray is turned and diverted onto side ledge conveyor No. 1. When the leading tray disengages limit switch LS5, the latter opens without effect as the operating coil of relay 1CB is maintained energized. When the leading tray engages limit switch LS8, shown in FIG. 1 and in the upper right-hand portion of FIG. 2a, contact 2 thereof completes an energizing circuit for subtracting coil 14f of counter 14 and a parallel circuit through brush 16a and contact T of switch 16 for operating coil 20 of first class transit and first class mail indicating counter 20a across lines L1 and L2. As a result, the actuating member of coil 14f is extended to step counter 14 back one step in the counterclockwise direction to operating position 4 to register the delivery of the first tray, and counter 20a is stepped one step to visually indicate delivery of one tray. When the first tray disengages limit switch LS8, contact 2 of the latter interrupts energization of coil 14f to permit the actuating member of the latter to be retracted by spring means or the like. Limit switch LS8 contact 2 also interrupts energization of coil 20 to reset the mechanism of counter 20a into readiness for taking the next step.

Similarly, each tray passing over limit switch LS8 causes counter 14 to be stepped back one step and causes counter 20a to be stepped forward one step. When the last tray, the fifth tray in this case, engages limit switch LS8, counter 20a is stepped to indicate the total trays of first class mail that have been delivered to side ledge conveyor No. 1 and counter 14 is stepped to its normal zero position wherein cam 14d causes switches 14a and 14b to reopen. Switch 14b cancels the call signal by interrupting energization of lamp 1CL and the operating coil of relay 1CA. Contact 1CA1 opens to interrupt energization of the operating coil of relay 1CB. Contact 1CA2 in the upper left-hand portion of FIG. 2b opens. Contact 1CA3 closes and contact 1CA4 opens in the right-hand midportion of FIG. 2b. Contact 1CA5 in the midportion of FIG. 2b opens and contact 1CA6 in the lower portion of FIG. 2b opens. The aforementioned opening of switch 14a interrupts energization of the operating coil of relay 1DR.

Deenergization of relay 1CB causes contact 1CB1 to open to interrupt the original energizing circuit of the operating coil of contactor 1M. However, contact 1 of limit switch LS8 maintains energization of contactor 1M and deenergizes the latter when the last tray disengages limit switch LS8. As a result, contacts 1M1, 1M2 and 1M3 open to deenergize motor M1 and to stop side ledge conveyor No. 1 from running. Contact 1CB2 closes and contact 1CB3 opens. Deenergization of the operating coil of relay 1DR causes contact 1DR1 to interrupt energization of operating coil 1D of diverter DM1 to cause the latter to be restored to its non-diverting position shown in solid lines in FIG. 1. Contact 1DR2 interrupts energization of the operating coil of relay 44 to cause contact 44a of the latter to be reclosed. Contact 1DR3 closes. It will be apparent that side ledge conveyor station No. 1 control circuit CC1 is thus restored to its normal condition and into readiness for the placing of another call for trays.

Closure of contact 44a as aforedescribed, unlocks switch 46 to permit the latter to recycle, that is, contact 44a reestablishes the circuit from contact L of switch 46 to the operating coil of relay 60 to permit switch 46 to be stepped from contact L to contact 1 to start a new cycle. However, in the event an order is being filled to any succeeding side ledge conveyor in the same cycle, contact 2DR2 or 3DR2 will be closed to maintain relay 44 energized and contact 44a open, such contact 2DR2 or 3DR2 closing as soon as a first tray has been released from a supply station and has engaged limit switch LS1, LS2 or LS3. Thus, if filling of side ledge conveyor No. 2 or No. 3 has begun and an order is placed at a preceding side ledge conveyor such as No. 1, switch 46 will rotate, upon deenergization of relay 42, to contact L and stop there until all succeeding orders in the cycle have been filled.

*Delivery of partial order*

In the event insufficient trays are available at a selected supply station when an order is placed, the available trays are released for delivery and the remainder of the order is canceled. To illustrate this, let it be assumed that when the aforedescribed order for five trays of first class transit mail was placed at side ledge conveyor station No. 1, there were only four trays available. As a result, limit switch LS1 counts the four trays and steps counters 14 and 26 to operating position 4 and steps switch 40 to its fourth operating position. In the meantime contact 5 of switch 40 has been marked with a voltage indicative of the fact that five trays were ordered. However, switch 40 will be ineffective to sense this marking.

When the fourth tray disengages limit switch LS1, the operating coil of relay 24 is deenergized to close contacts 24b and 24c. Contact 24b causes energization of the operating coil of tray stop TS1 through contacts 1CA6 and 48b, brush 62a and contact T of switch 62 and contact 42c to attempt to release another tray without effect, however, because further trays are not available behind tray stop TS1. Contact 24c completes an energizing circuit for the operating coil of relay 38 through contacts 1CA6, 48c and 42d because switch 40 has failed to energize relay 42. As a result, contact 38a opens to start timing the closure of contact 32a. When the four trays pass limit switch LS4, counter 26 is stepped into its normal zero position to open switch 26e without effect as contact 42a in series therewith has remained open.

The four trays travel along main conveyor 8 and relay 38 remains energized. The opening of contact 38a causes initiation of discharge of timing capacitor 39. The discharge current flows through resistor 34 and maintains transistor 30 conducting and the operating coil of relay 32 energized for a predetermined time interval. When the time interval has elapsed, contact 32a closes to complete an auxiliary energizing circuit for the operating coil of relay 42 and resetting coil 40f of switch 40. Coil 40f causes resetting of switch 40 to its normal zero position as hereinbefore described. Relay 42 closes contact 42b to energize coil 46c and opens contact 42c to deenergize the operating coil of tray stop TS1 to stop further trays if any should arrive thereat. Contact 42d interrupts energization of the operating coil of relay 38 to close contact 38a. As a result, capacitor 39 recharges and the operating coil of relay 32 is energized to open contact 32a. This causes deenergization of coil 40f and the operating coil of relay 42. Contact 42b opens to deenergize coil 46c whereby switch 46 is stepped to position 2 and contact 48b of relay 48 prevents further energization of the operating coil of relay 38 and the operating coil of tray stop TS1.

When the first tray engages limit switch LS5, side ledge conveyor No. 1 is started as hereinbefore described. Operating coil 1D having been energized in response to the first step of counter 14 as aforementioned, diverter DM1 has been actuated into its diverting position and diverts the four trays onto side ledge conveyor No. 1. When the four trays pass limit switch LS8, the same are registered on counter 20a and counter 14 is stepped back to its normal zero position. As a result, switches 14a and 14b reopen to restore control circuit CC1 to its normal position as hereinbefore described. This restoration of control circuit CC1 in effect cancels the remainder of the order, that is, cancels the order for the fifth tray which was not available.

*Storage of order*

In the event no trays are available at a selected supply station when an order is placed, such order is stored, the system is made available to control the filling of succeeding orders in the same cycle and the stored order is filled on a succeeding cycle when at least one tray becomes available. To illustrate this, let it be assumed that when the aforesaid order for five trays of first class transit mail was placed at side ledge conveyor station No. 1, supply conveyor 2 was empty. In the manner hereinbefore described, brush 46b of switch rotates to contact 1. Contact 5 of counter 40 is marked with a voltage to indicate that five trays were ordered. The operating coil of tray stop TS1 is energized in an attempt to release trays from supply conveyor 2. However, as no trays are released, counters 14, 26 and 40 remain in their normal zero position. Diverter DM1 is not actuated and side ledge conveyor No. 1 is not started as relay 1CB remains deenergized. The operating coil of relay 38 energizes in the aforedescribed circuit and opens contact 38a. Capacitor 39 starts to discharge and after a time interval, the operating coil of relay 32 deenergizes to close contact 32a to complete the auxiliary circuit. As a result, the operating coil of relay 42 energizes and closes contact 42b. This causes energization of coil 46c to extend pawl 46d to engage the next tooth on ratchet wheel 46a. Contact 42c interrupts energization of the operating coil of tray stop TS1. Contact 42d interrupts energization of the operating coil of relay 38 to reclose contact 38a. This causes capacitor 39 to recharge and the operating coil of relay 32 energizes to restore relay 42. Contact 42b deenergizes coil 46c and pawl 46d is withdrawn to step switch 46 to contact 2. Relay 48 is restored whereby contact 48b opens to prevent further energization of the operating coils of tray stop TS1 and relay 38.

It will, therefore, be apparent that the system was restored to its normal condition and became available to control the filling of succeeding orders as soon as switch 46 rotated to contact 2. However, as counter 14 was not stepped and relay 1CB was not energized, lamp 1CL remains lit and the operating coil of relay 1CA remains energized through switch 12 and contacts 1CA1 and 1CB2. Also, contacts 1CA2, 1CA4, 1CA5 and 1CA6 remain closed and contact 1CA3 remains open. This condition of the contacts of relay 1CA constitutes a storage of the order which was not filled.

If a succeeding side ledge conveyor station has not placed a call following storage of the aforementioned order switch 46 will repeatedly rotate to contact 1 to attempt to fill the stored order. If a succeeding side ledge conveyor station has placed a call, switch 46 will rotate to find such call and the system will proceed to control the filling thereof. To illustrate these functions, it will be apparent that upon the stepping of switch 46 to contact 2 and storage of the aforementioned call, an energizing circuit is completed by contact 52a through contacts 1CA4, 1DR3, 2CA3 and 46e' for coil 46c of switch 46 and is interrupted by contact 46e' to step switch 46 to the next contact. If station No. 3 has placed a call, contact 3CA3 will be open and switch 46 will stop on contact 3 to control the filling of such order. Otherwise, if no further calls have been placed, coil 46c will be energized in shunt of contacts 52a and 2CA3 through contacts 56a and 3CA3 and through similar contacts of additional station control relays and alternatively deenergized by self-interrupting contact 46e' to continue stepping the switch. Thus, switch 46 will rotate through the used contacts and through the vacant contacts under the control of relay 60 to the last contact L. As contact 44a is closed, relay 60 will further control stepping of switch 46 to contact 1. If no trays are available at the selected supply station, relay 32 will initiate another cycle of rotation of switch 46 after a time interval. If trays are then available, switch 46 stops on contact 1 to cause delivery of the trays to side ledge conveyor No. 1.

*Memory devices*

Means are incorporated in the system to register information pertaining to each step of the operation and to maintain storage of this information in the event of power failure so that upon reestablishment of power the trays that were in transit will be delivered to the correct destination and the operation will be resumed in accordance with the preselection. In other words, the system in effect remembers the location of each tray that is in transit and correctly and automatically delivers such tray when the power is reconnected. This is a significant improvement over prior systems wherein, in the event of power failure, all trays in transit must be manually lifted off the conveyors and carried back to their starting points in order to obtain correct delivery thereof when the power is reestablished.

These memory devices comprise counters 14, 26 and 40 and selector switch 46 and circuits cooperating therewith. It will be apparent that regardless of the point at which the system is stopped, counters 14, 26 and 40 will have registered the number of trays that have passed the selected supply station limit switch LS1, LS2 or LS3.

Also, switch 46 will have registered information indicative of the side ledge conveyor station to which trays were being delivered. Moreover, counter 26 will have registered the number of trays that have entered upon main conveyor 8 and have passed limit switch LS4 and counter 14 will have registered the number of trays that have been delivered and maintains the call signal.

To illustrate the effectiveness of the memory devices, let it be assumed that side ledge conveyor station No. 1 has ordered five trays and that delivery thereof has been initiated. Let it also be assumed that the leading tray has passed limit switch LS4 on main conveyor 8 and that the fourth tray is on limit switch LS1 when the power fails. Under this condition, contact 1 of limit switch LS1 is open and contact 2 thereof is closed. Selector switch 46 is on contact 1. Counters 14 and 40 are in their fourth operating position. Counter 26 is in its third operating position. Relays 1CA, 1DR, 22, 24, 32, 44, 48 and 50 and coils 14e, 26a and 40e and lamps 1CL and 1FL are energized.

When power fails, supply conveyors 2, 4 and 6 and main conveyor 8 stop and the aforementioned relays and coils are deenergized. During the failure and reconnection of power, counters 14 and 40 remain in their fourth operating position and counter 26 remains in its third operating position as the operating circuits of coils 14e and 40e are interrupted by contact 24a and the operating circuit of coil 26a is interrupted by contact 22b.

Means comprising relay 22 is provided to prevent a false count when power fails while a tray is passing over limit switch LS1 and when the power is reconnected. The power failure causes deenergization of the operating coil of relay 22. Contact 22a opens to interrupt its maintaining circuit. Contact 22b opens the energizing circuit of relay 24 and coil 26a. As a result, when power is reconnected, relay 24 and coil 26a will not be energized to register a false count although contact 2 of limit switch LS1 is closed because contact 22b remains open. The energizing circuit of relay 24 and coil 26a cannot again be completed until the tray that was resting on limit switch LS1 disengages the latter and closes contact 1 of limit switch LS1 to energize the operating coil of relay 22. This causes closure of contact 22a to maintain relay 22 and causes closure of contact 22b. Thereafter, coil 26a registers a correct count and relay 24 causes coils 14e and 40e to register correct counts, respectively, when the next tray engages limit switch LS1 and closes contact 2 thereof.

When the power is reconnected, lamp 1CL lights and the operating coil of relay 1CA is energized through switches 12 and 14b. The operating coil of relay 1DR energizes through switch 14a. Contact 1DR1 closes to energize coil 1D to actuate diverter DM1 to its diverting position. Contact 1DR2 closes to energize the operating coil of relay 44. The operating coil of relay 48 and lamp 1FL energize through brush 46b and contact 1 of switch 46. The operating coil of relay 50 energizes through brush 46b and contact 1 of switch 46 and contact 1CA5 which is now closed. The operating coil of relay 38 energizes in its aforementioned circuit and opens contact 38a to start capacitor 39 discharging. The operating coil of tray stop TS1 energizes in its aforementioned circuit to release the fifth tray. The supply conveyors and the main conveyor start.

When the fourth tray disengages limit switch LS1, contact 1 thereof closes to energize the operating coil of relay 22. Contact 2 of limit switch LS1 opens to prevent a false count when contact 22b closes. Contact 22a recloses the self-maintaing circuit. The fifth tray then passes over limit switch LS1 and the operation continues as hereinbefore described.

In the event a tray is resting on limit switch LS4 when the power fails, contact 22b of relay 22 opens to prevent a false feedback count in a manner similar to that hereinbefore described as contact 22b is also in circuit with coil 26b. In the event one or more trays have been delivered when the power fails, relay 1CB will deenergize to stop motor M1 of side ledge conveyor No. 1. When the power is reconnected and the next tray engages limit switch LS5, the operating coil of relay 1CB is reenergized to start motor M1.

Closure of Jog switch 9 causes energization of contactor 1M and motor M1 to move the delivered trays along side ledge conveyor No. 1.

Means comprising cancel switch 12 is provided for canceling an order provided delivery thereof has not begun. In the event it is desired to cancel an order, cancel switch 12 is pressed to deenergize the operating coil of relay 1CA to cancel the call sagnal. As a result, contact 1CA6 opens to prevent energization of the operating coil of tray stop TS1, TS2 or TS3 and to prevent the release of trays from the supply station. Contact 1CA1 opens the maintaining circuit to prevent reenergization of relay 1CA when cancel switch 12 is released. Contact 1CA4 opens to deenergize coil 46c and to stop switch 46 at contact 1, 2 or 3 or to stop switch 46 at contact 1 if it is stepping through the vacant contacts. As a result, the system is restored to its normal condition.

Figure 3:
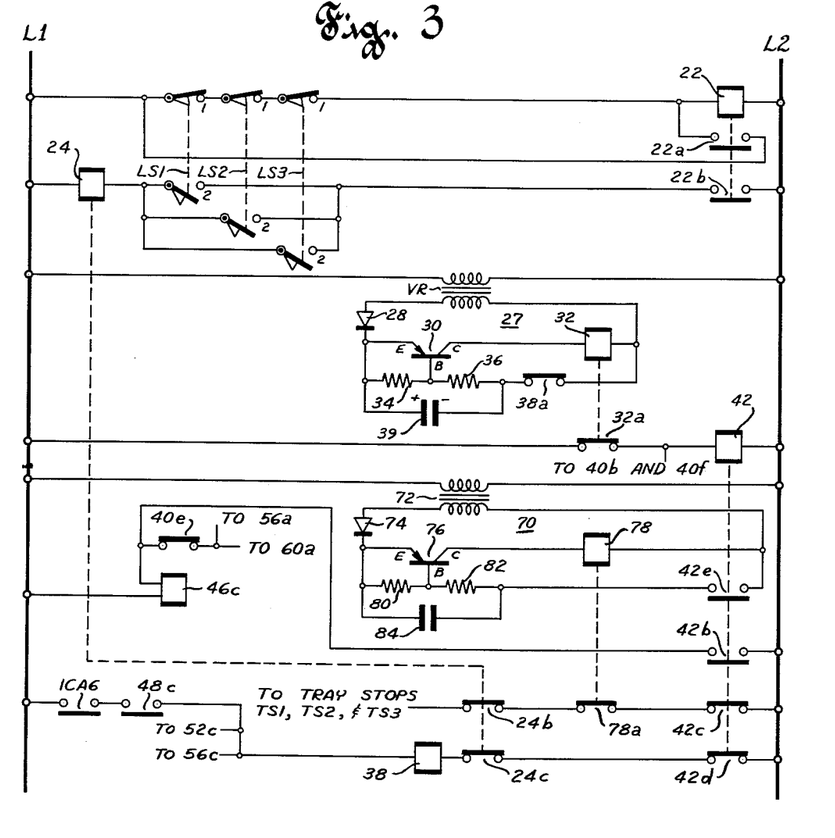
FIG. 3 diagrammatically shows a portion of the control circuit of FIGS. 2a and 2b modified to provide timing means in place of the feedback means of FIGS. 2a and 2b.

Referring to FIG. 3, there is shown a modification of the system of FIGS. 2a and 2b. Instead of employing a feedback count for conditioning the system to release further groups of trays in response to succeeding orders as soon as the trays of the order being filled have reached the main conveyor, the modification employs timing means for so conditioning the system a predetermined time interval after the release of the last tray of the order being filled. FIG. 3 shows a portion of the system of FIGS. 2a and 2b modified to substitute a timing circuit for the feedback counting apparatus. In the modification, feedback limit switch LS4 including its contacts 1 and 2 have been omitted. Also, counter 26 and its coils 26a and 26b and its switch 26e have been omitted. Moreover, the maintaining circuit for the operating coil of relay 42 including contact 42a has been omitted.

Instead, relay 42 has been provided with a normally open contact 42e for controlling a timing circuit 70. Timing circuit 70 is provided with a supply transformer 72 of the voltage reducing type having its primary winding connected across supply lines L1 and L2. The left-hand end of the secondary winding of transformer 72 is connected through a unidirectional conducting device such as a diode 74, emitter E and collector C of a transistor 76 of the solid element semi-conductor type and the operating coil of a relay 78 to the right-hand end of the secondary winding. A parallel circuit extends from the junction of diode 74 and emitter E through voltage divider resistors 80 and 82 and normally open contact 42e of relay 42 to the right-hand end of the secondary winding, the junction of resistors 80 and 82 being connected directly to base B of transistor 76. A timing capacitor 84 is connected across resistors 80 and 82. Relay 78 is provided with a normally closed contact 78a in the energizing circuit of the operating coils of tray stops TS1, TS2 and TS3. The remaining circuit elements in FIG. 3 are the same as in the system of FIGS. 2a and 2b and have been given like reference characters.

The operation of the system of FIG. 3 will now be described. It will be recalled that when the last released tray of the order for five trays passes over limit switch LS1, the operating coil of relay 42 is energized. While in FIGS. 2a and 2b relay 42 was self-maintained and was thereafter deenergized by feedback counter 26, in FIG. 3 relay 42 energizes momentarily and deenergizes as soon as selector switch 40 is reset to its normal zero position. Energization of relay 42 causes closure of contact 42b to energize coil 46c of switch 46 whereby the operating pawl engages the next tooth on the ratchet wheel. Contact 42c opens to deenergize the operating coil of tray stop TS1 to prevent release of further trays from supply conveyor 2. Contact 42d opens to interrupt energization of the operating coil of relay 38 to prevent timed deenergization of the operating coil of relay 32. Contact 42e closes to energize the operating coil of relay 78. When contact 42e closes, current flows through diode 74 and contact 42e to charge capacitor 84 whereafter such current is diverted through resistors 80 and 82 in shunt of capacitor 84. The voltage drop across resistor 80 is applied across the emitter-base junction of transistor 76 to render the latter conducting and to energize the operating coil of relay 78. As a result, contact 78a opens a point in the energizing circuits of the operating coils of tray stops TS1, TS2 and TS3 to prevent release of trays from any of the supply stations until timing circuit 70 times out.

It will be recalled that, concurrently with energization of the operating coil of relay 42, switch 40 also energizes resetting coil 40f to restore the switch to its normal zero position. This causes deenergization of the operating coil of relay 42 to open contacts 42b and 42e and to close contacts 42c and 42d. Contact 42b interrupts energization coil 46c to step switch 46 to the next contact, that is, contact 2 in the above example. Contact 42e interrupts the charging circuit of capacitor 84. As a result, capacitor 84 begins to discharge through resistors 80 and 82. The discharge current flow through resistor 80 maintains transistor 76 conducting and the operating coil of relay 78 energized for a predetermined time interval sufficient to afford time for the last released tray to enter upon main conveyor 8, such time interval being determined by the time constant of the RC circuit. Closure of contact 42c has no effect as the tray stops are maintained in their stopping condition by contact 78a being open. Closure of contact 42d has no effect as the stepping of switch 46 to position 2 caused opening of contact 48c to maintain the operating coil of relay 38 deenergized.

At the end of the time interval, relay 78 deenergizes and recloses contact 78a to reestablish the connection from supply line L2 to the operating coils of tray stops TS1, TS2 and TS3 thereby to condition the system for release of trays from the supply stations in response to a call signal from a succeeding side ledge conveyor station.

When there are insufficient trays at the selected supply station to fill an order, timing circuit 27 functions as hereinbefore described to complete an energizing circuit for the operating coil of relay 42 through closure of contact 32a in shunt of counter 40. Timing circuit 70 then functions as hereinbefore described to interrupt the circuit of the operating coils of the tray stops for a time interval. In this connection, it will be apparent that contact 42d interrupts energization of the operating coil of relay 38 to reclose contact 38a. This causes reenergization of the operating coil of relay 32 to open at contact 32a the energizing circuit of the operating coil of relay 42. Thus, the partial order is delivered, the remainder of the order is canceled, and the system is conditioned for release of trays in response to orders from succeeding delivery stations.

When there are no trays available at the selected supply station to fill an order, timing circuit 27 functions as hereinbefore described to complete an energizing circuit for the operating coil of relay 42 through closure of contact 32a in shunt of counter 40. Timing circuit 70 then functions as hereinbefore described to interrupt the circuit of the operating coils of the tray stops for a time interval. After such time interval, the order is stored and the system is conditioned for release of trays in response to orders from succeeding delivery stations as hereinbefore described.

While the apparatus hereinbefore described is effectively adapted to fulfill the objects stated, we do not intend to confine our invention to the particular preferred embodiments of memory type order filling conveyor systems disclosed, inasmuch as they are susceptible of various modifications without departing from the scope of the appended claims.

We claim:

1. In a conveyor system for conveying articles from a supply station to a plurality of delivery stations, control means operable in response to a call signal for controlling delivery of a selected number of articles from the supply station to a selected delivery station, said control means comprising means for transmitting a call signal indicative of a selected number of articles and a selected delivery station, means responsive to said call signal for releasing the selected number of articles from the supply station for travel toward the delivery stations, diverting means for each delivery station, means responsive to release of said articles for operating the diverting means of the selected delivery station to its diverting position, and means responsive to movement of the articles for registering the progressive movement of the articles in transit to control said releasing means and said selected diverting means.

2. The invention defined in claim 1, wherein said registering means comprises memory means for maintaining a record of such progressive movement of the articles in the event of interruption of power to said control means thereby to control the latter to cause correct delivery of the articles in transit and to resume normal operation when the power is reconnected.

3. The invention defined in claim 1, wherein said registering means comprises memory means for counting the articles and for maintaining a record of such progressive movement of the articles in the event of power interruption to said control means thereby to control the latter to cause delivery of the articles in transit to their preselected destinations and to resume normal operation when the power is reconnected, and means for preventing a false count responsive to interruption and reconnection of power in the event a given article is being counted when the power is interrupted.

4. The invention defined in claim 2, wherein said memory means comprises means for registering the release of each article from the supply station, and means for registering the arrival of each article at the selected delivery station.

5. The invention defined in claim 4, wherein said control means further comprises means responsive to correspondence of the registrations of the released articles and the delivered articles for restoring said control means to normal condition.

6. The invention defined in claim 2, wherein said memory means comprises means for registering the release of each article from the supply station, means for registering the movement of each article past an intermediate point between the supply station and the delivery stations, and means responsive to the latter registration for conditioning said control means to respond to further call signals and to control deliveries of articles in response thereto.

7. The invention defined in claim 2, wherein said memory means comprises means for registering the release of each article from the supply station, timing means responsive to the release of the last article of the selected number of articles for preventing release of further articles from the supply station for a predetermined time interval, and means responsive to said timing means at the end of said time interval for conditioning said control means to respond to further call signals and to control release of articles in accordance therewith.

8. The invention defined in claim 2, wherein said memory means comprises means for detecting the release of each article, timing means controlled by said detecting means and being operable following the detecting of the last released article when there are less than said selected number of articles for release at the supply station for timing a predetermined time interval, and means responsive to said timing means at the end of said time interval for conditioning said control means to respond to another call signal and to control release of articles in accordance therewith.

9. The invention defined in claim 8, together with means responsive to delivery of said lesser number of articles to the selected delivery station for canceling the first mentioned call signal.

10. The invention defined in claim 2, together with timing means responsive to said call signal for timing a predetermined time interval, means responsive to each released article for rendering said timing means ineffective before it has timed out, said timing means being operable when there are no articles for release to time out, and means responsive to said timing means at the end of said time interval for conditioning said control means to respond to further call signals and to control release of articles in accordance therewith, and the first mentioned call signal being stored to reoperate said control means in the absence of said further call signals or after articles have been released in response to such further call signals.

11. The invention defined in claim 1, wherein said call signal transmitting means comprises means at each delivery station for preselecting a desired number of articles and means for initiating operation of said control means, together with call indicator means at each delivery station, and means responsive to said initiating means for operating said call indicator means.

12. The invention defined in claim 1, wherein said releasing means comprises a normally latched article stop at the supply station, means responsive to said call signal for causing unlatching of said article stop to permit the latter to release an article, and sensing means responsive to each released article for causing relatching of said article stop to stop the next article and for again causing unlatching of said stop to permit the latter to release the next article thereby to space the articles from one another.

13. The invention defined in claim 1, wherein said means for operating the diverting means of the selected delivery station comprises means responsive to the first article released by said releasing means for operating said diverting means to its diverting position, and means responsive to the last article upon delivery thereof to said selected delivery station for causing restoration of said diverting means to its non-diverting position.

14. The invention defined in claim 1, together with selectively operable means for canceling said call signal at any time before the first article has been released from the supply station.

15. In a conveyor system for conveying articles from a supply station to a plurality of delivery stations, control means operable in response to a call signal for controlling conveyance of articles from the supply station to a selected delivery station, said control means comprising means for transmitting a call signal for a selected number of articles, means responsive to said call signal for releasing the selected number of articles from the supply station for travel toward the delivery stations, means responsive to release of said articles for diverting the same to the selected delivery station as the articles approach the latter, and means responsive to movement of the articles for registering the progress of the articles in transit to control said releasing means and said diverting means, and said registering means comprising memory means for maintaining a record of such progress in the event of interruption of power to said control means thereby to control the latter to cause correct delivery of the articles in transit and to resume normal operation when the power is reconnected, said memory means comprising a counter, sensing means responsive to each released tray for stepping said counter, and switch means responsive to the first step of said counter for operating the diverting means of the selected delivery station.

16. In a conveyor system for conveying articles from a supply station along a main conveyor to a plurality of delivery stations spaced along the main conveyor, control means for controlling delivery of articles from the supply station to a selected delivery station, said control means comprising settable means for preselecting a desired number of articles for delivery to a selected delivery station, starting means for initiating operation of said control means after said preselecting means has been set, delivery station seeking means responsive to said starting means for finding said selected delivery station, means responsive to said seeking means finding said selected delivery station for releasing said preselected number of articles from the supply station for travel along the main conveyor, a plurality of diverter mechanisms for turning and diverting articles to the respective delivery stations, said diverter mechanisms being normally in their non-diverting positions, means responsive to release of said articles from said supply station for operating the diverter mechanism corresponding to the selected delivery station to its diverting position whereby to divert said articles to said selected delivery station, and memory means responsive to initiation of delivery of articles from the supply station toward the delivery stations for registering and maintaining a record of the progress of the delivery whereby in the event of interruption and reestablishment of power to said control system said articles are delivered in the preselected manner.

17. In a conveyor system for conveying articles from a supply station along a main conveyor to a plurality of delivery conveyors spaced along the main conveyor, control means operable in response to call signals for controlling conveyance of selected numbers of articles from the supply station along the main conveyor to selected delivery conveyors in sequential cycles, said control means comprising means for transmitting call signals indicative of selected numbers of articles and selected delivery conveyors, means responsive to a call signal for releasing a selected number of articles from the supply station for entry upon the main conveyor and for travel therealong toward the delivery conveyors, a inverting device for each delivery conveyor mounted at the intersection of the latter and the main conveyor, means responsive to release of at least one article from the supply station for operating the diverting device of the selected delivery conveyor into its article diverting position, means responsive to movement of the released articles for counting and registering the progressive movement of the articles in transit to control said releasing means and the diverting device of the selected delivery conveyor, means responsive to the last article of the selected number of articles entering upon the main conveyor for conditioning said control for response to other call signals to control conveyance of selected numbers of articles to other selected delivery conveyors in the same cycle in the order of their spacing from the supply station.

18. The invention defined in claim 17, wherein said control means further comprises means for detecting the release of a lesser number of articles than the selected number thereof when there are insufficient articles at the supply station for release responsive to a call signal, said conditioning means being unresponsive to such lesser number of articles, and auxiliary means responsive to said detecting means after a predetermined time interval for canceling the call signal with respect to the remaining articles and for conditioning said control means for response to further call signals.

19. The invention defined in claim 17, wherein said control means further comprises means responsive to transmission of said call signal for maintaining the latter until the released articles are delivered, means responsive to arrival of the last released article at the selected delivery conveyor for restoring said call signal maintaining means, means responsive to said call signal when transmitted for initiating the timing of a predetermined time interval, means responsive to at least one released article for rendering said timing means ineffective, and auxiliary means responsive to said timing means at the end of said time interval when there are no articles for release at the supply station for conditioning said control means for response to further call signals to control conveyance of articles to succeeding selected delivery conveyors in the order of their spacing from the supply station in the same cycle, said restoring means being ineffective to restore said call signal maintaining means when articles are not released from the supply station thereby to store said call signal, and said control means being effective in the absence of said further call signals to recycle in response to said stored call signal and to render said releasing means effective to release articles when available for delivery to the first selected delivery conveyor.

20. In a conveyor system for conveying articles from a plurality of supply stations along a main conveyor to a plurality of delivery station conveyors spaced along the main conveyor, control means for controlling conveyance of a selected number of articles from a selected supply station to a selected delivery station conveyor, said control means comprising means for transmitting a call signal indicative of a selected supply station and a selected number of articles and a selected delivery station, means responsive to said call signal for releasing the selected number of articles from the selected supply station for travel along the main conveyor toward the delivery station conveyors, a diverting device for each delivery station conveyor for turning and diverting articles from the main conveyor thereto, and means responsive to movement of the released articles for counting the same and for registering the progressive movement of the articles in transit to control said releasing means and the diverting device associated with the selected delivery station conveyor.

21. The invention defined in claim 20, wherein said counting and registering means comprises memory means for continuously maintaining a record of such progressive movement of the articles in transit so that in the event of interruption of power to said control means a record of the location of each article in transit is stored and when the power is reconnected the articles in transit are delivered to their preselected destination and normal operation is resumed.

22. The invention defined in claim 21, wherein said counting and registering means further comprises limit switch means operable by said articles in transit for operating said memory means, and means for preventing a false count responsive to interruption and reconnection of power to said control means in the event an article is in engagement with said limit switch means when the power is interrupted.

23. The invention defined in claim 20, wherein said means for transmitting a call signal comprises manual means at each delivery station conveyor for preselecting one of said plurality of supply stations for release of articles therefrom to the main conveyor, manual means at each delivery station conveyor for preselecting a desired number of articles for release by the preselected supply station, and manual switch means at each delivery station conveyor for initiating operation of said control means to thereupon automatically control release of the selected number of articles from the selected supply station and diversion thereof from the main conveyor to the delivery station conveyor wherefrom said call signal was transmitted.

24. The invention defined in claim 20, wheren said releasing means comprises an article stop at each supply station, stepping means common to said supply stations and said delivery station conveyors and responsive to a call signal from a given delivery station conveyor for stepping to an operating position indicative of said given delivery station conveyor, and means responsive to said stepping means stopping at said operating position for unlatching the stop at the selected supply station to permit release of articles therefrom.

25. The invention defined in claim 20, wherein said counting and registering means comprises a limit switch at each supply station operable by each released article, stepping means for each delivery station conveyor responsive to said limit switches for counting the released articles and for registering such count, and means responsive to the first step of said stepping means when the first article is released from the selected supply station for actuating the diverting device of the selected delivery station conveyor to its diverting position.

26. The invention defined in claim 25, wherein said control means also comprises a delivery conveyor control limit switch on the main conveyor for each delivery station conveyor and operable by the moving articles as they approach the respective delivery station conveyors, a motor for operating each delivery station conveyor, and means responsive to engagement of the delivery conveyor control limit switch of the selected delivery station conveyor by the leading released article for energizing the associated motor.

27. The invention defined in claim 26, wherein said counting and registering means further comprises a delivery control limit switch at each delivery station conveyor operable by each article delivered thereto, means responsive to operation of the associated delivery control limit switch for reoperating said stepping means to count the delivered articles and to register such count, and means responsive to registration of a count on said stepping means indicative of the delivery of the last released article for causing restoration of the associated diverting device to its non-diverting position and for conditioning said call signal transmitting means for selective transmission of another call signal.

28. The invention defined in claim 20, wherein said counting and registering means comprises means responsive to release of the last article of the selected number of articles for preventing the release of further articles from the selected supply station, and means responsive to said released articles entering upon the main conveyor for conditioning said control means for response to another call signal.

29. The invention defined in claim 28, wherein said conditioning means comprises means responsive to the last article of the selected number of articles entering upon the main conveyor for conditioning said control means for response to another call signal, and said control means further comprises means for detecting the release of a lesser number of articles than the selected number thereof when there are insufficient articles at the selected supply station, said conditioning means being unresponsive to such lesser number of articles, and auxiliary means responsive to said detecting means after a predetermined time interval sufficient to allow time for the released trays to enter upon the main conveyor for canceling the call signal with respect to the remaining articles and for conditioning said control means for response to another call signal.

30. The invention defined in claim 20, wherein said counting means comprises means for sensing the release of each article, timing means controlled by said sensing means and being operable following the sensing of the last released article when there are less than the selected number of articles for release at the selected supply station for timing a predetermined time interval, said time interval being sufficient to afford time for such last released article to enter upon the main conveyor, and means responsive to said timing means at the end of said time interval for conditioning said control means to respond successively to further call signals and to control release of articles in accordance therewith.

31. The invention defined in claim 20, wherein said counting means comprises means for detecting the release of each article from the selected supply station, timing means responsive to the release of the last article of the selected number of articles for preventing release of further articles from any of the supply stations for a predetermined time interval, said time interval being sufficient to afford time for the last released article to enter upon the main conveyor, and means responsive to said timing means at the end of said time interval for conditioning said control means for response to another call signal and to control release of articles in accordance therewith.

32. The invention defined in claim 20, wherein said control means further comprises means responsive to transmission of said call signal for maintaining the latter, means responsive to arrival of the last released article at the selected delivery station conveyor for restoring said call signal maintaining means, means responsive to said call signal for timing a predetermined time interval, means responsive to said released articles for rendering said timing means ineffective, and auxiliary means responsive to said timing means at the end of said time interval when there are no articles for release at the selected supply station for conditioning said control means for response to another call signal.

33. The invention defined in claim 23, together with manual means at each delivery station conveyor for stopping operation of said control means at any time before the first article has been released from the selected supply station thereby to cancel said call signal.

References Cited in the file of this patent

UNITED STATES PATENTS

| | | |
|---|---|---|
| 2,362,079 | McCann | Nov. 7, 1944 |
| 2,728,466 | Postlewaite | Dec. 27, 1955 |
| 2,924,324 | Benson | Feb. 9, 1960 |